(12) United States Patent
Emerson

(10) Patent No.: US 7,775,962 B2
(45) Date of Patent: *Aug. 17, 2010

(54) CENTRIFUGE WITH POLYMERIZING ENERGY SOURCE

(75) Inventor: Jane Emerson, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 11/933,871

(22) Filed: Nov. 1, 2007

(65) Prior Publication Data

US 2008/0108493 A1 May 8, 2008

Related U.S. Application Data

(63) Continuation-in-part of application No. 11/499,436, filed on Aug. 4, 2006, now Pat. No. 7,674,388.

(60) Provisional application No. 60/707,299, filed on Aug. 10, 2005.

(51) Int. Cl.
*B01D 21/26* (2006.01)
*B01D 11/00* (2006.01)
*B03D 1/001* (2006.01)
*C08F 2/50* (2006.01)
*B01L 99/00* (2010.01)
*A01N 1/02* (2006.01)

(52) U.S. Cl. ............... 494/37; 210/511; 210/512.3; 210/516; 210/781; 210/782; 252/60; 522/6; 422/101; 422/102; 435/2

(58) Field of Classification Search .............. 210/781, 210/782, 789; 494/37; 525/444
See application file for complete search history.

(56) References Cited

U.S. PATENT DOCUMENTS

| | | | | |
|---|---|---|---|---|
| 4,652,354 | A * | 3/1987 | Place et al. | 204/466 |
| 6,248,844 | B1 * | 6/2001 | Gates et al. | 525/444 |
| 7,211,037 | B2 | 5/2007 | Briggs et al. | |
| 2006/0086675 | A1 | 4/2006 | E. Purdum | |
| 2006/0160025 | A1 | 7/2006 | Lungu | |
| 2006/0160915 | A1 * | 7/2006 | Fuchs et al. | 522/6 |
| 2007/0003588 | A1 | 1/2007 | Chin et al. | |
| 2007/0005024 | A1 | 1/2007 | Weber et al. | |
| 2007/0020629 | A1 | 1/2007 | Ross et al. | |
| 2007/0187341 | A1 | 8/2007 | Emerson | |

* cited by examiner

*Primary Examiner*—Krishnan S Menon
*Assistant Examiner*—Dirk Bass
(74) *Attorney, Agent, or Firm*—Fish & Associates, PC

(57) ABSTRACT

Methods for using a centrifuge are presented. A vessel containing a sample and a separator substance is placed within a centrifuge. Upon sufficient centrifugation, the sample separates into two or more fractions separated by the separator substance. The centrifuge exposes the separator substance to a sufficient energy to polymerize the separator substance to produce a hardened barrier between the fractions.

12 Claims, 2 Drawing Sheets

CENTRIFUGE WITH POLYMERIZING ENERGY SOURCE

This application is a continuation-in-part of co-owned, pending U.S. application Ser. No. 11/499,436 filed Aug. 4, 2006 which claims priority to U.S. provisional application Ser. No. 60/707,299 filed Aug. 10, 2005. These and all other extrinsic references are incorporated herein by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is separation technologies.

BACKGROUND

Centrifuges are used throughout the world to separate fractions of blood and other fluids. Some centrifuges include energy sources for imparting ultraviolet, vibrational or other energies to the sample for various purposes, including sterilization. For example, both U.S. patent application number US2006/0086675 and U.S. Pat. No. 7,211,037 teach using a centrifuge and ultraviolet light to decontaminate samples.

Co-owned, co-pending U.S. applications, U.S. Ser. No. 11/499,436 titled "Photopolymer Serum Separator" (the '436 application) and U.S. Ser. No. 11/933,839 titled "Collection Tubes Apparatus, Systems, and Methods" (the "839" application), teach polymerizing a separator substance after centrifugation, which could conceivably be accomplished with one or more of the prior art centrifuges. But it appears that no one has ever used centrifuges for that purpose, with respect to separation of blood or any other liquid.

Thus, there is still a need for methods of using centrifuges as energy sources that help in maintaining separation of different fractions in a sample.

SUMMARY OF THE INVENTION

The present invention provides apparatus, systems and methods in which a centrifuge includes an energy source that used to polymerize a separator substance.

In a preferred embodiment, a vessel containing the separator substance and a liquid sample are disposed within a centrifuge for centrifugation. Once the sample separates into at least two fractions, an energy source associated with the centrifuge exposes the tube contents to a polymerizing energy, which causes the separator substance to form a hardened barrier between the fractions.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
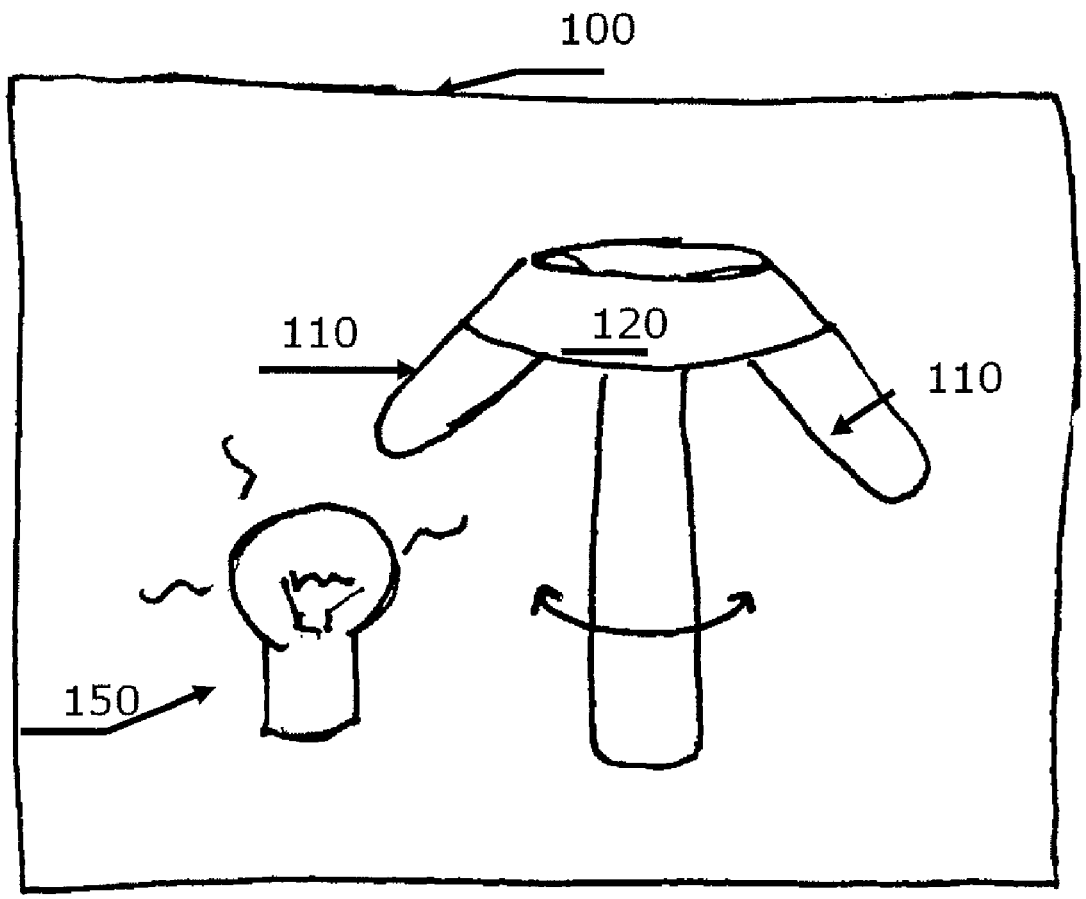
FIG. 1 is a side view of a centrifuge having an energy source used to trigger polymerization of a separator substance.

FIG. 1 a centrifuge 100 generally comprises a rotor 120 having one or more of tube holder 110 and an energy source 150.

A user collects a blood sample in a collection tube having the separator substance. The user places the tube in tube holder 110 and centrifuges the sample by rotating rotor 120. When desired, the tube is exposed to energy source 150 to harden the separator substance; usually after separation. In the presented example, tube holder 110 and rotor 120 are substantially transparent to energy source 150 to ensure the separator substance is properly exposed to energy source 150.

Energy source 150 can produce any suitable type or amount of energy. Preferred energy sources include a UV light source providing light having a wavelength in the range from 10 nm to 450 nm, and more preferably in the range from 250 nm to 400 nm. Alternative contemplated energy sources include those that provide energy from other parts of the electromagnetic spectrum, particle radiation, thermal radiation, vibration, or other sources that can initiate polymerization.

In preferred embodiments, exposure to an energy source that triggers polymerization does not adversely affect characteristics of the sample. For example, M1L1A1 hardens within 10 seconds ensuring the temperature of a whole blood sample changes little during exposure. Preferably, the temperature changes by less than 10 degrees Celsius during polymerization; more preferably by less than 5 degrees Celsius. Short exposure times ensures the sample will maintain appropriate pigmentation levels, gas levels, temperatures, protein levels, or other characteristics associated with the sample.

Some embodiments include automating whole blood separation processes through the use of a centrifuge. Once the blood is separated after centrifugation, the tubes are removed and exposed to an energy source robotically, or more preferably, centrifuge 100 automatically exposes separator substance to energy source 150 which can be located within centrifuge 100.

In a preferred embodiment, centrifuge 100 can be adapted to assist in automating blood separation. For example, centrifuge 100 can include a processing unit to run a program that controls an intensity level of energy source 150 or the duration of exposure to energy source 150. Furthermore, once a user disposes a tube in centrifuge 100, centrifuge 100 can automatically expose the tube to energy source 150 without requiring additional interaction with the user. It is also contemplated that centrifuge 100 can be adapted with energy source 150 after purchase. For example, a lab could purchase a centrifuge lacking a UV light source and then purchase a UV source, typically as part of a kit, which can be disposed within the centrifuge.

Figure 2:
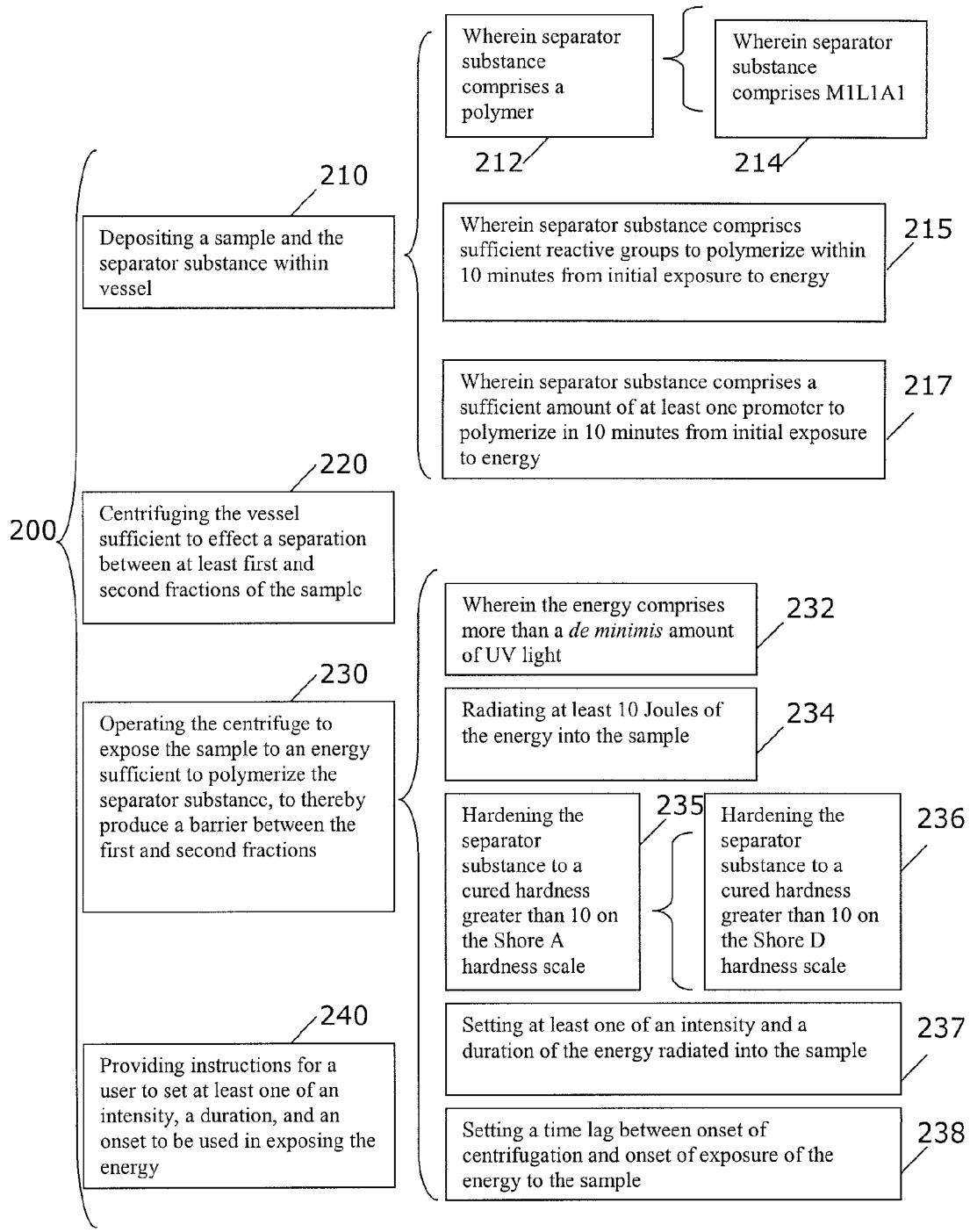
FIG. 2 is a schematic of a method for using a centrifuge to polymerize an separator substance.

FIG. 2 is a schematic of method 200 for using a centrifuge to initiate polymerization of a separator substance. At step 210 a sample and a separation substance are deposited into a vessel. A preferred vessel comprises a tube, although all other containers capable of holding a sample and separator substance are also contemplated.

At step 212, a preferred embodiment employs a polymer as the separator substance and at step 214 an especially preferred embodiment employs a composition derived from M1L1A1 as the separator substance. In some embodiments, the separator substance includes sufficient reactive groups (at step 215) or promoters (at step 217) to polymerize within 10 minutes of initial exposure to an energy source. The separator substance is formulated to have a density that is intermediate between the density of a first fraction of the sample and a second fraction of the sample.

At step 220, the prepared vessel is centrifuged to a sufficient level to separate the sample into a first and second fraction. For example, when the sample is whole blood and is centrifuged, the whole blood separates into a serum fraction and cell containing fraction. The separator substance has a density that allows it to migrate between the two fractions during centrifugation, thereby producing a separation layer. Typically whole blood is centrifuged from about five to about 15 minutes, although the time for separation can vary widely for other types of samples or other analysis purposes.

At step 230, the centrifuge is operated to expose the sample to an energy source supplying sufficient energy to polymerize the separator substance thereby producing a barrier between the two fractions. In a preferred embodiment, at step 232, the energy comprises more than a minimum amount of UV light and preferably, at step 234, radiates the sample with at least 10 Joules of energy.

At step 235, preferably, the separator substance hardens to at least 10 on the Shore A hardness scale, or, alternatively, at step 237 the separator substance hardness to at least 10 on the Shore D hardness scale. The Shore hardness scales are one set of scales used to indicate hardness. Other appropriate hardness scales can also be used, all of which are contemplated.

Operating the centrifuge at step 230 can also include configuring the centrifuge to adjust the energy source. At step 237, one can set the intensity or the duration that the energy source radiates energy into the sample. In addition, at step 238 one can set the time lag between the onset of centrifugation and the onset of exposure. For example, the centrifuge could be programmed to expose the sample to UV light after a preset amount of time after centrifugation is started. Other contemplated energy source adjustments include determining exposure requirements from the tube, adjusting the total energy radiated, pulsing the energy source, adjusting a frequency or a wavelength, adjusting an amplitude, adjusting a temperature, providing alert conditions, or other configurations associated with the energy source.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using a centrifuge to initiate polymerization of a separator substance, comprising:
    depositing a sample and a curable separator substance within a vessel, where the curable separator substance has a density intermediate between at least first and second fractions of the sample;
    centrifuging the vessel sufficiently to effect a separation of the at least first and second fractions where the curable separator substance becomes positioned to separate the fractions; and
    operating the centrifuge, after separation, to expose the curable separator substance to an energy sufficient to polymerize the curable separator substance into a hardened barrier between the first and second fractions.

2. The method of claim 1, wherein the separator substance comprises a polymer.

3. The method of claim 2, wherein the separator substance comprises M1L1A1.

4. The method of claim 1, wherein the separator substance comprises sufficient reactive groups to polymerize within 10 minutes from initial exposure to the energy.

5. The method of claim 1, wherein the separator substance comprises a sufficient amount of at least one promoter to polymerize in 10 minutes from initial exposure to the energy.

6. The method of claim 1, wherein the step of operating comprises hardening the separator substance to a cured hardness greater than 10 on the Shore A hardness scale.

7. The method of claim 6, wherein the step of operating comprises hardening the separator substance to a cured hardness greater than 10 on the Shore D hardness scale.

8. The method of claim 1, wherein the energy comprises more than a de minimis amount of UV light.

9. The method of claim 1, wherein the step of operating comprises radiating at least 10 Joules of the energy into the sample.

10. The method of claim 1, wherein the step of operating comprises setting at least one of an intensity and a duration of the energy radiated into the sample.

11. The method of claim 1, wherein the step of operating comprises setting a time lag between onset of centrifugation and onset of exposure of the energy to the sample.

12. The method of claim 1, further comprising providing instructions for a user to set at least one of an intensity, a duration, and an onset to be used in exposing the substance to the energy.

* * * * *